Figure 1:
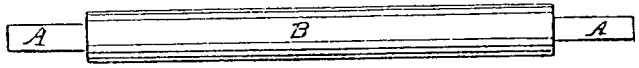

Sam¹. C. Bishop.

Insulating Telegraph and Electric Wires.

No. 71688

PATENTED DEC 3 1867

Witnesses.
W. Morris Smith
Sydney E. Smith

Inventor.
Sam¹ C. Bishop
by Attorneys
Brown, Coombs & Co

United States Patent Office.

SAMUEL C. BISHOP, OF NEW YORK, N. Y., ASSIGNOR TO BISHOP GUTTA-PERCHA COMPANY, OF SAME PLACE.

Letters Patent No. 71,688, dated December 3, 1867.

IMPROVEMENT IN INSULATING COVERING FOR TELEGRAPH AND CIRCUIT-WIRES.

The Schedule referred to in these Letters Patent and making part of the same.

TO ALL WHOM IT MAY CONCERN:

Be it known that I, SAMUEL C. BISHOP, of the city, county, and State of New York, have invented a new and useful Improvement in Insulating Telegraph and Electric Wires or Conductors, of which the following is a full, clear, and exact description. In the drawings accompanying this specification—

Figure 2:

Figure 1 represents a section of telegraph-wire coated with my improved insulator, and Figure 2, a transverse section of the same, in which A represents the wire, and B the gum coating applied thereto.

My invention consists in insulating telegraph and electric wires or conductors, by using, as India rubber or gutta percha have heretofore been employed for that purpose, a gum known as valata or balata, and which is obtained from a tree or plant indigenous to certain portions of South America, but which is more tractable and easier to work than India rubber in its unprepared state, and less brittle than gutta percha, and capable of being worked or used under much higher temperatures than the latter substance.

To coat telegraph-wires with valata or balata, this gum may first be treated as gutta percha is treated, by soaking, macerating, and kneading, or working it into a plastic mass, and applying it to and round the wire by a suitable pressing-device and die, as or much in the same manner as telegraph-wires are now coated with gutta percha or rubber. Being so much more easily worked than rubber, and less brittle and unaffected by high temperatures than gutta percha, this gum, which may be manipulated in hotter water than the latter substance, will be a most advantageous substitute for either rubber or gutta percha for the purpose here mentioned.

What I claim as my discovery, and desire to secure by Letters Patent, is—

Insulating telegraph and electric wires or conductors by means of valata or balata, substantially as specified.

SAML. C. BISHOP.

Witnesses:
P. NOLAN,
GEORGE H. STARR.